United States Patent [19]

Haydu

[11] Patent Number: 4,829,408

[45] Date of Patent: May 9, 1989

[54] RETAINER FOR REPLACEABLE HEADLAMP BULB

[75] Inventor: Bartley A. Haydu, Anderson, Ind.

[73] Assignee: General Motors Corporation, Detroit, Mich.

[21] Appl. No.: 231,023

[22] Filed: Aug. 11, 1988

[51] Int. Cl.$^4$ .......... B60Q 1/00

[52] U.S. Cl. .......... 362/61; 362/226; 362/306

[58] Field of Search .......... 362/61, 80, 226, 306, 362/443, 267, 296, 457, 458

[56] References Cited

U.S. PATENT DOCUMENTS

| | | | |
|---|---|---|---|
| 4,500,946 | 2/1985 | Mikola | 362/226 |
| 4,590,542 | 5/1986 | Schauwecker et al. | 362/61 |
| 4,670,822 | 6/1987 | Baker | 362/61 |
| 4,679,128 | 7/1987 | Van Duyn et al. | 362/61 |
| 4,682,274 | 7/1987 | Freudenreich et al. | 362/61 |
| 4,709,305 | 11/1987 | McMahan et al. | 362/61 |
| 4,747,029 | 5/1988 | Liverance et al. | 313/113 |
| 4,774,645 | 9/1988 | Iwamoto | 362/61 |

*Primary Examiner*—Ira S. Lazarus
*Assistant Examiner*—D. M. Cox
*Attorney, Agent, or Firm*—Edward J. Biskup

[57] ABSTRACT

A light bulb retainer for a headlamp reflector characterized in that the retainer is formed with a plurality of radially outwardly extending flanges which are movable into precut slits formed in a plurality of circumferentially spaced projections on the reflector for securing the retainer to the reflector.

10 Claims, 2 Drawing Sheets

RETAINER FOR REPLACEABLE HEADLAMP BULB

This invention concerns headlamps and more particularly relates to a vehicle headlamp having a retainer arrangement for maintaining a replaceable light bulb within an opening formed in the rear of a headlamp reflector.

U.S. Pat. No. 4,747,029, issued on May 24, 1988 in the name of Liverance et al and assigned to the assignee of this invention, discloses a retainer assembly secured to the rear portion of a headlamp reflector for supporting a replaceable light bulb and serves to locate the light bulb in a predetermined position relative to the reflecting surface of the reflector. The retainer assembly includes an inner disk member and outer disk member fastened together so as to form an annular cavity for receiving a portion of the light bulb. More specifically, the outer disk member is formed with a plurality of circumferentially spaced access slots for receiving the radially outwardly extending ears formed on the light bulb after which the latter is rotated so that the ears are pressed inwardly by spring members integral with the outer disk member to allow the light bulb to assume a locked position relative to the retainer assembly. The inner disk member has a central opening surrounded by an axially extending skirt which can serve to support a shield for blocking stray light rays emanating from the light bulb when the replaceable light bulb is located within the reflector. In addition, the retainer assembly has four circumferentially spaced openings through which screws serve to secure the retainer to cylindrical bosses formed on the rear of the reflector.

The present invention concerns a retainer which is adapted to support a replaceable light bulb in the manner described above, however, rather than utilizing screws for fastening the retainer to the reflector, the present invention utilizes saw-type teeth integrally formed with the retainer for self-retention with circumferentially spaced projections formed around the lamp bulb opening provided in the rear of the reflector. Thus, the teeth formed on the retainer provide a simplified manner of quickly fastening the retainer to the reflector without requiring the insertion and positioning steps required when utilizing screws for assembly of the above described retainer assembly on a plastic reflector housing.

Accordingly, the objects of the present invention are to provide a new and improved retainer for a replaceable light bulb that can be readily fastened to a reflector housing without requiring the use of separate fastening members: to provide a new and improved retainer for a replaceable light bulb in which the retainer when rotated is adapted to cut slits into a plurality of circumferentially spaced projections formed around the light bulb opening in the rear of the reflector for self-retention purposes: to provide a new and improved retainer for a replaceable light bulb that is integrally formed with saw-type teeth which ar adapted to simultaneously cut slits into a plurality of circumferentially spaced projections surrounding the lamp bulb opening formed in the rear of a reflector and thereby cause the retainer to be supported by the projections: and to provide a new and improved retainer for a replaceable lamp bulb characterized in that the retainer has a circular flange integral therewith which is rotatable into slits formed in a plurality of circumferentially spaced projections on a reflector for securing the retainer to the reflector Other objects and advantages of the present invention will be apparent from the following detailed description when taken with the drawings in which FIG. 1 is a perspective view showing the rear of a reflector of a replaceable lamp bulb type headlamp with a retainer according to the present invention separated from the reflector;

Figure 1:
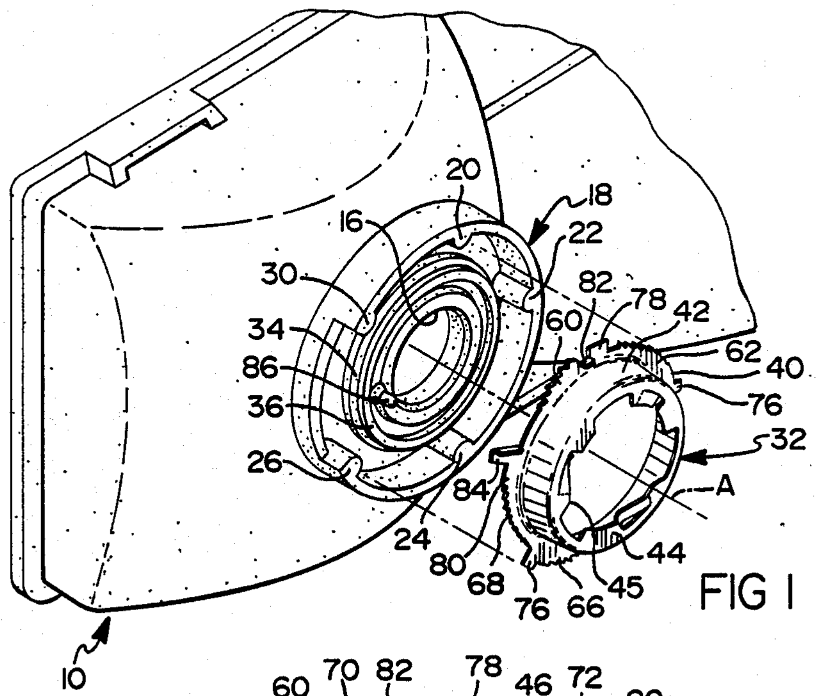
Figure 4:
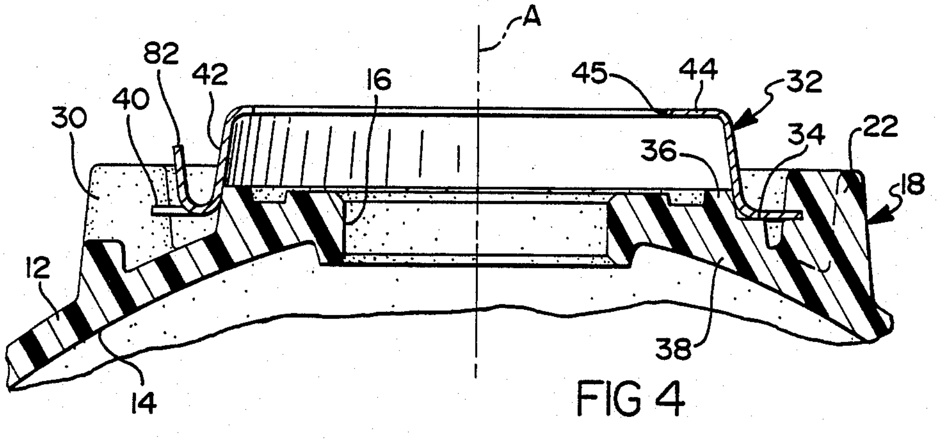
FIG. 4 is a sectional view of the retainer and reflector taken on line 4—4 of FIG. 3.

Referring now to the drawings and more particularly FIGS. 1 and 4 thereof, the rear end of a vehicle headlamp 10 is shown which includes a reflector 12 made of a plastic material and formed with a pair of side-by-side cavities each of which has an aluminized parabolic reflecting surface 14, as seen in FIG. 4. The rear central area of each cavity of the reflector 12 is formed with a circular opening 16 surrounded by a collar 18 which has five circumferentially spaced identical semi-cylindrical projections 20, 22, 24, 26 and 30 integrally formed therewith to which is secured a retainer 32 made in accordance with the present invention. The retainer 32 serves to support a replaceable light bulb (not shown) and is secured to the reflector 12 and located thereon so as to assure that the light bulb is positioned in a predetermined position relative to the reflecting surface 14 of the associated cavity in the reflector 12. The retainer 32 when mounted and secured to the reflector 12 can serve to receive and position a type HB3 and HB4 standardized replaceable light bulb approved for use by the U.S. Motor Vehicle Safety Standard No. 108. A light bulb of this type can be seen in the aforementioned patent and, in general, includes a base portion formed of insulating material that supports a wedge-type glass capsule. The base portion is integrally formed with three circumferentially spaced and radially outwardly extending ears adapted to be received by the retainer as will hereinafter be described.

Figure 2:
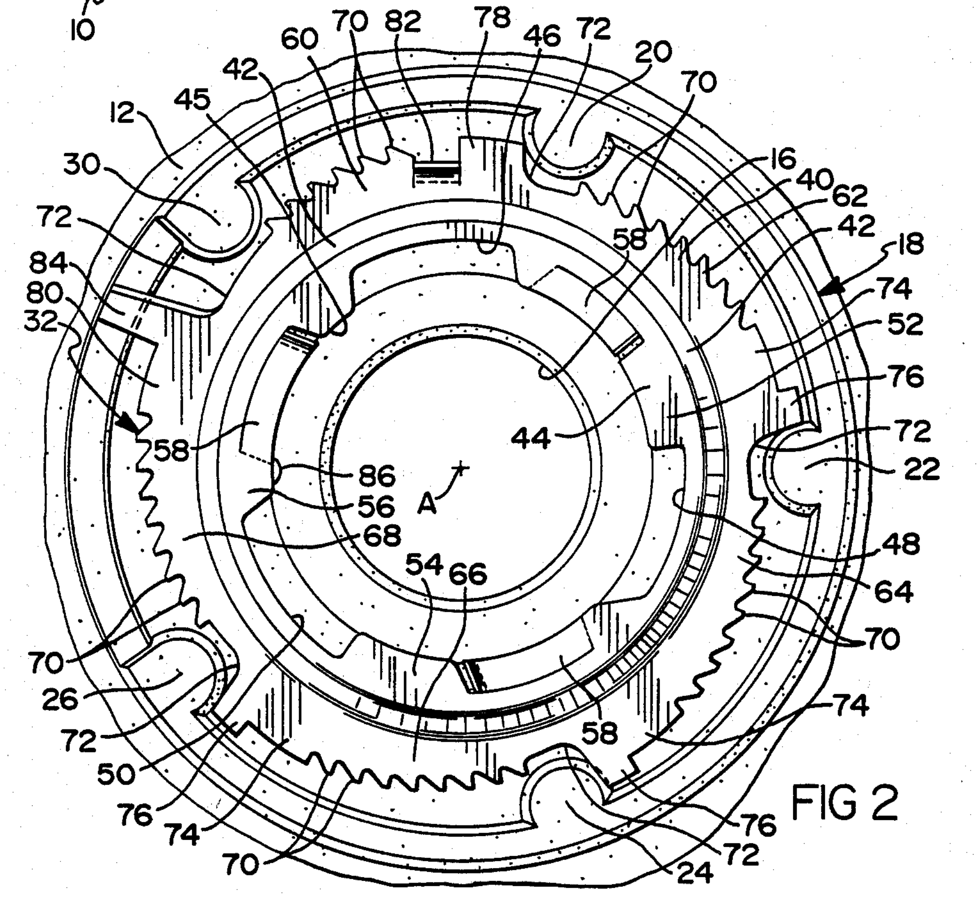
FIG. 2 is an enlarged view of the rear of the reflector showing the retainer positioned within the confines of a plurality of circumferentially spaced projections which are integrally formed with the reflector.
Figure 3:
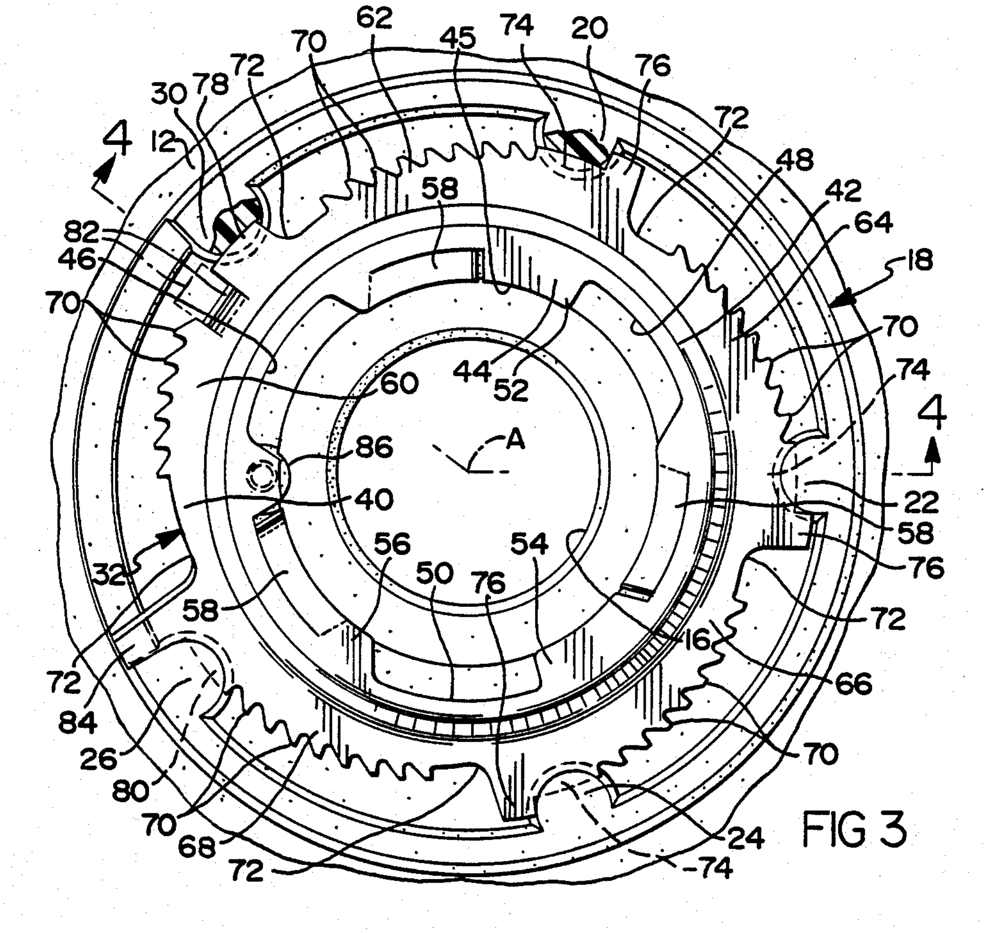
FIG. 3 is a view similar to FIG. 2 but shows the position of the retainer after the retainer has been rotated in a counterclockwise direction and has cut slits into the surrounding projections.

As seen in FIGS. 2 and 3, the collar 18 is concentrically located with respect to the opening 16. Also, as seen in FIGS. 1 and 4, an annular support surface 34 and a guide ring 36 are formed on an enlarged section 38 surrounding opening 16 of the reflector. The support surface 34 is located in a plane which is substantially perpendicular to the longitudinal center axis A of the opening 16. As in the case of the collar 18, the outer periphery of the guide ring 36 is concentrically located with respect to the opening 16.

The retainer 32, according to the present invention, is a sheet metal stamping which, as seen in FIG. 4, is hat-shaped in cross-section. More specifically, the retainer 32 includes a rim portion 40, a frusto-conical sidewall 42, and an end wall 44, all of which are integrally formed with each other. The end wall 44 and the rim portion 40 are located in parallel planes. In addition, the end wall 44 is formed with a central opening 45 surrounded by three radially extending access slots 46, 48, and 50 which connect with curved walls 52, 54 and 56 (defining the central opening 45) each of which includes a spring section 58 normally extending towards the opening 16 formed in the reflector 12. The outer periphery of the rim portion 40 is formed with five cutting sections 60, 62, 64, 66 and 68 which are circumferentially spaced from each other. Each cutting section 60–68 includes a plurality of saw-type teeth 70 located on an arc of a circle having its center offset from the center of the central opening 45 so that, in the case of each cutting section, the teeth 70 are in an ascendant order. That is, the teeth 70 are positioned further away from the sidewall 42 as one follows the teeth 70 in a clockwise direction as viewed in FIGS. 2 and 3. Between each adjacent pair of cutting sections 60–68, an L-shaped notch 72 is provided. Also, the cutting sections 62, 64 and 66 are essentially identical in configuration and each includes a flange 74 and a stop member 76. The cutting sections 60 and 68 also include flanges 78 and 80, respectively, the outer periphery of which as well as the outer periphery of the flanges 74 are located on a circle having its center coincidental with the axis A and the center of the central opening 45 formed in the retainer 32. It will be noted, however, that between the cutting section 60 and flange 78, a tang 82 is provided, which as seen in FIG. 4, extends rearwardly outwardly of the plane of the rim portion 40 when the retainer is in the position of FIG. 2 and afterwards is depressed forwardly to assume the dotted line position of FIG. 3 when the retainer 32 is fully assembled to the reflector 12. It will also be noted that between the cutting sections 60 and 68 a radially outwardly extending foot 84 is provided adjacent associated flange 80.

In order to secure the retainer 32 to the reflector 12, the retainer 32 is initially placed within the confines of the projections 20–30 with the rim portion 40 seated on the support surface 34 and the inner surface of the sidewall 42 contacting the guide ring 36 as seen in FIG. 4. In this position and as seen in FIG. 2, the central opening 45 of the retainer 32 is concentrically located with respect to the opening 16 in the reflector 12 Also, the projections 20–30 are located adjacent the slots 72 of the retainer 32 and the stop members 76 contact the the associated projections 20–30. It will be noted that the outer tip of each of the teeth 70 of each of the cutting sections 60–68 as well as the outer periphery of each flange 74, 78 and 80 and each stop member 76 is located a greater distance from the center A of the opening 45 than any portion of each projection. As a result, when the retainer 32 as seen in FIG. 2, is rotated in a counterclockwise direction relative to the projections 20–30, the teeth 70 of each cutting section cuts into the adjacent projection and forms a slit therein into which the associated flange moves as the retainer 32 is rotated. The rotation of the retainer 32 can be realized utilizing electrically or air powered a rotary driver fitted with a specially designed tool which will engage the foot 84 of the retainer 32 and provide the required counter-clockwise drive thereto. Rotation will continue in a counterclockwise direction until the stop members 76 contact the projections 20. 22 and 24 as seen in FIG. 3. In this position, each flange 74, 78 and 80 is located within the slit cut in the associated projection and the retainer 32 is secured from axial movement relative to the reflector 12 with the central opening 45 in the retainer 32 maintaining concentricity with the opening 16 in the reflector 12. The final step in the assembly of the retainer 32 to the reflector 12 is to bend the tang 82 into the dotted line position of FIG. 3 so as to securely lock the retainer 32 in the position and prevent clockwise movement of the retainer 32.

Once the retainer 32 is locked in position as seen in FIG. 3, the retainer 32 is in a condition to receive a replaceable light bulb. In this regard, it will be noted that the access slots 48 and 50 are identical in size and configuration while the access slot 46 has a slightly different configuration than the slots 48 and 50. Similarly, two of the ears formed with the light bulb will have the general configuration and size of access slots 48 and 50 while the third ear will be designed to be received only by the access slot 46. This coordinated design of ears on the light bulb and the access slots assures that the light bulb assembly is properly received within the opening 45 in the retainer 32 when the light bulb is manually inserted therein.

Thus, when the light bulb is inserted into the opening 45, the ears are aligned with and located within the access slots 46–50 and afterwards the base portion of the light bulb is rotated clockwise until one ear contacts a stop 86 fixed to the reflector 12. The light bulb will then assume a position at which point the light bulb is prevented from further clockwise movement by the stop 86. It will be understood that the spring sections 58 adjacent each access slot serve to press the light bulb into contact with the reflector 12 adjacent the opening 16 so that proper orientation of the light bulb along the longitudinal axis of the bulb and relative to the reflecting surface 14 is attained. Also, the tang 82 serves to prevent any movement of the retainer 32 when the light bulb is rotated in a counter-clockwise direction for removal from the retainer 32.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination, a vehicle headlamp assembly including a plastic reflector the front portion of which is formed with a cavity having a parabolic reflecting surface and a circular opening formed in said reflecting surface for receiving the light bulb of a replaceable light bulb assembly, a plurality of circumferentially spaced and axially outwardly extending projections integrally formed with the rear portion of such reflector and surrounding said circular opening, a metal retainer for receiving said replaceable light bulb assembly located within the confines of said plurality of projections, said retainer having the periphery thereof formed with a plurality of teeth adapted to cut a slit into each of said projections when the retainer is rotated so as to secure said retainer to said projections and said reflector.

2. In combination, a vehicle headlamp assembly including a plastic reflector the front portion of which is formed with a cavity having a parabolic reflecting surface and a circular opening formed in said reflecting surface for receiving the light bulb of a replaceable light bulb assembly, a plurality of circumferentially spaced and axially outwardly extending projections integrally formed with the rear portion of such reflector and surrounding said circular opening, a slit provided in each of said projections extending transversely to the longitudinal axis of each of said projections, a circular metal retainer for receiving said replaceable light bulb assembly located within the confines of said plurality of projections and having the periphery thereof located in said slit in each of said projections so as to secure said retainer to said projections and said reflector.

3. In combination, a vehicle headlamp assembly including a plastic reflector the front portion of which is formed with a cavity having a parabolic reflecting surface and a circular opening formed in said reflecting surface for receiving the light bulb of a replaceable light bulb assembly, a collar surrounding said circular opening and extending axially outwardly from the rear portion of said reflector, a plurality of circumferentially spaced and axially outwardly extending projections integrally formed with the inner portion of said collar, a circular metal retainer for receiving said replaceable light bulb assembly located within the confines of said plurality of projections, said retainer having the periphery thereof formed with a plurality of teeth adapted to cut a slit into each of said projections when the retainer is rotated in one direction and simultaneously secure said retainer to said projections and said reflector.

4. The combination of claim 3 wherein said retainer is hat shaped in cross-section and includes a rim portion provided with said plurality of teeth.

5. The combination of claim 4 wherein said teeth are located on an arc of a circle having its center offset from the center of said retainer so that the teeth are in an ascendant order.

6. The combination of claim 5 wherein said rim portion is formed with stop means which limit the rotation of said retainer when said retainer is being rotated for cutting said slits into said projections.

7. The combination of claim 6, wherein a foot extends radially outwardly from said rim portion and provides a drive connection for a power-operated rotary tool.

8. The combination of claim 7 wherein guide means are formed on said reflector around said circular opening for maintaining said retainer concentric with said circular opening during the rotation and assembly of said retainer with said projections.

9. The combination of claim 8 wherein said retainer is formed with a tang which cooperates with one of said projections for preventing said retainer from being rotated in a direction opposite to said one direction.

10. The combination of claim 9 wherein said teeth are formed on a plurality of circumferentially spaced sections of said rim that correspond in number to the number of said projections.

* * * * *